United States Patent [19]

Wolfbauer et al.

[11] Patent Number: 4,728,259

[45] Date of Patent: Mar. 1, 1988

[54] ADJUSTABLE TURBINE

[75] Inventors: Wilhelm Wolfbauer, Fernitz; Franz D. Podesser, Voitsberg, both of Austria

[73] Assignee: Rohren- und Pumpenwerk Rudolf Bauer Gesellschaft m.b.H., Voitsberg, Austria

[21] Appl. No.: 878,125

[22] Filed: Jun. 25, 1986

[30] Foreign Application Priority Data

Jun. 25, 1985 [AT] Austria ............................... 1890/85

[51] Int. Cl.$^4$ ............................................. F01D 17/14
[52] U.S. Cl. ..................................... 415/151; 415/159
[58] Field of Search ............... 415/148, 150, 151, 159, 415/167, 202, 92; 416/197 B

[56] References Cited

U.S. PATENT DOCUMENTS

| 1,626,298 | 4/1927 | Rambo | 415/202 X |
| 2,083,447 | 6/1937 | Hoffmann | 415/148 X |
| 2,141,923 | 12/1938 | McMahan | 415/148 X |
| 2,875,696 | 3/1959 | von Zborowski | 415/148 X |
| 4,519,211 | 5/1985 | Sedille et al. | 415/151 X |

FOREIGN PATENT DOCUMENTS

| 352460 | 7/1977 | Austria. | |
| 364566 | 12/1979 | Austria. | |
| 377676 | 4/1983 | Austria. | |
| 5350310 | 10/1976 | Japan | 415/151 |
| 82/00686 | 3/1982 | PCT Int'l Appl. | 415/151 |

Primary Examiner—Robert E. Garrett
Assistant Examiner—Joseph M. Pitko
Attorney, Agent, or Firm—Karl F. Ross; Herbert Dubno

[57] ABSTRACT

A turbine, particularly for a sprinkler system, comprises a rotor mounted on a shaft so as to be rotatable about a rotor axis and having a plurality of curved vanes attached to the wheel rim, a variable nozzle and a control device for control of the flow of water through the turbine. The control device is mounted in a ring shaped space, is a part of the nozzle and a part of the wall of the ring shaped space and the control device controls the size of both an annular clearance between the turbine wheel and the control device and the cross section of the nozzle so that the cross section of the nozzle and the annular clearance are correlated with each other. Advantageously the control device may be a broad surface curved plate mounted on a pivot shaft so as to be pivotable partly between two parallel walls of a fixed part of the nozzle formed by the turbine housing and shaped to follow the radius of curvature of the outer periphery of the rotor. This plate may also have a finger like projection underneath it opposite its pivot shaft and oriented in the direction of the longitudinal axis of the plate.

7 Claims, 3 Drawing Figures

ADJUSTABLE TURBINE

FIELD OF THE INVENTION

Our invention relates to a turbine and, more particularly, to an adjustable turbine for a sprinkler or irrigation system.

BACKGROUND OF THE INVENTION

An adjustable-speed water driven turbine can comprise a rotor mounted on a shaft so as to be rotatable about a rotor axis and having a plurality of curved vanes, a variable nozzle in a water-entrance opening of the device and a control device for control of the flow of water through the turbine.

A free jet turbine for a traveling sprinkling irrigating device is taught in Austrian Pat. No. 352,460, in which the direction of the free jet is controllable in order to change the turbine speed. The water stream flowing through the turbine nozzle can be divided by a steel deflector so that it is not longer concentrated as it reaches the turbine vanes and a part of the energy contained in the stream is dissipated.

The deflector shifted in front of the nozzle acts to provide an uncontrollable turbulence and spraying and uniform control of the rotational speed can thus not be attained over a wide range.

By the uniformly high flow speed in the nozzle and the associated turbulence resulting from the stream deflector, an undesirably strong pressure drop occurs in the turbine because of the flow and friction losses. To change the direction of the free jet the nozzle is supported pivotally in a relatively costly construction.

A turbine for a spraying mechanism is described in the Austrian Pat. No. 364,566. The housing of the turbine has a substantially tangential feed pipe and a control device for the rotational speed of the turbine is provided which depends, in a reel driving irrigator, on the pipe draw-in or take up speed. This control device comprises a controlling valve or flap mounted in the vicinity of the mouth of the feed pipe by which the size of the cross section of the mouth of the feed pipe and the stream direction of the water fed into the turbine is changed.

Austrian Pat. No. 377,676 describes a water turbine, advantageously for a sprinkling device, in which in the vicinity of the entrance opening and advantageously also in the vicinity of the adjacent portion of the water feed tube a movable wall portion determining the flow cross section is provided. The movable wall is adjustable by a cam engaging it from the outside.

A change of the entrance flow momentum is possible because of this structure. The second of the two drive components, namely the pulling device above all can not be influenced.

Consequently an optimum adjustment of the entrance cross section and the annular clearance in the turbine to minimize shock losses is not possible.

OBJECTS OF THE INVENTION

It is an object of our invention to provide an improved turbine, particularly for a sprinkling device, which obviates the aforedescribed disadvantages.

It is a further object of our invention to provide an improved adjustable turbine, whose rotational speed is uniformly adjustable but which has a good efficiency and only a slight pressure drop over a wide range of turbine speeds.

It is another object of our invention to provide an improved adjustable turbine whose rotational speed is uniformly adjustable but which is inexpensive to construct.

SUMMARY OF THE INVENTION

These objects and others which will become more readily apparent hereinafter are attained in accordance with our invention in a turbine, particularly for a sprinkler system, comprising a rotor mounted on a rotor shaft so as to be rotatable about a rotor axis and having a plurality of curved vanes attached to it, a variable nozzle and a control device for control of a flow of water through the turbine.

According to our invention the control device is mounted in a ring-shaped or annular space, is a part of the nozzle and a part of the wall of the ring shaped space and the control device controls both an annular clearance in the turbine and also the cross section of the nozzle so that the size of the annular clearance is correlated with the flow cross section of the nozzle.

Consequently, starting from one highest rotational speed by a continuous and finely adjustable cross section enlargement of the nozzle the flow speed of the water can be continuously and substantially monotonically described while the same jet direction is maintained, that is, the momentum or impulse of the water stream on the vanes of the turbine wheel is reduced and this momentum reduction directly corresponds to a rotational speed decrease.

The deflector which follows the nozzle acts so that the jet after impinging on the vanes without great turbulence is guided to the outlet opening. Thus it is good both for fine adjustment and also for efficiency of the turbine to make the annular clearance between the deflector and the turbine wheel depend on the nozzle cross section.

The control device for the entrance opening can extend up to the outlet opening in the turbine housing of the turbine and is advantageously a single piece.

The control device or deflector advantageously is pivotally monted on a pivot shaft so as to be pivotable about a pivot axis substantially parallel to the rotor axis.

The pivot axis of the control device can be positioned on the opposite side of the turbine from the nozzle in the vicinity of the outlet opening of the turbine housing.

The control device can have a broad surface plate following the radius of curvature of the outer diameter of the turbine wheel of the turbine and having a fingerlike projection positioned opposite the pivot axis in the direction of the longitudinal axis of the plate. The fingerlike projection is advantageously movable in a fixed part of the nozzle formed by the turbine housing between two parallel walls. The upper side of the fingerlike projection in the uppermost pivot position of the control device is mirror-symmetrical in shape with the opposing part of the nozzle.

The finger-shaped projection can extend under the plate as a reinforcing rib. The reinforcing rib can be directly connected like the plate with the pivot shaft eye, i.e. can be formed in one piece therewith.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 3:
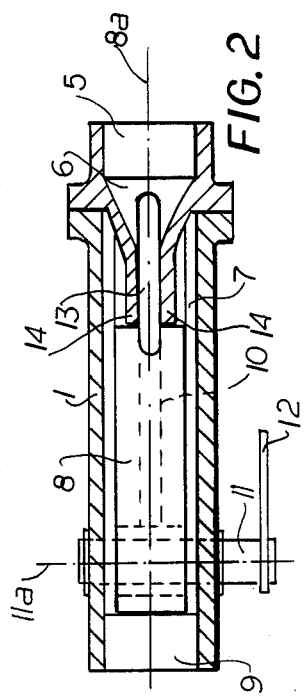
FIG. 3 is a cross sectional view of the apparatus of FIG. 1 taken along the section line III—III of FIG. 1.

A turbine shaft 2 is rotatably mounted in a turbine housing 1. a turbine rotor 3 is attached on the inner end of the spindle 2 and comprises with a plurality of bucket-like or curved vanes 4 mounted on its outer circumference like a Pelton turbine. The turbine rotor is rotatable about a spindle axis 2a.

The water operating the turbine reaching the interior of the turbine through an entrance opening 5 is concentrated and/or accelerated and strikes the central region of the curved vanes 4.

The water stream transfers its energy to the turbine wheel by being deflected in the turbine housing 1. The turbulence occurring in the flow does not impede flow through a pipe like duct 7 in the turbine housing 1 and by a deflector or control device 8. Thus a satisfactory water flow passage to the outlet opening 9 is guaranteed.

Figure 2:
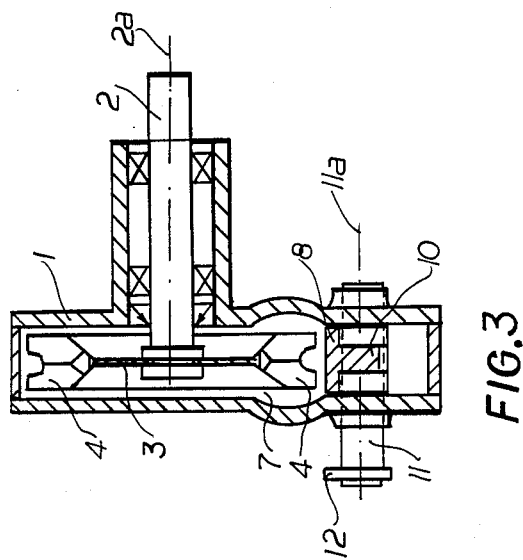
FIG. 2 is a cross sectional view of the apparatus of FIG. 1 taken along the section line II—II of FIG. 1.

A deflector 8, which is a curved four sided plate in the embodiment shown in FIG. 2 and may be positioned in close contact longitudinally and transversely with the contour of the turbine wheel, is reinforced by a rib 10 on its underside and extends from the nozzle 6 up to the outlet opening 9.

The deflector 8 is mounted on a pivot shaft 11 near the outlet opening 9 is the turbine housing 1 and can be pivoted about a pivot shaft axis 11a from the ouside of the turbine by a lever 12 and/or by adjusting or servo motor connected to the pivot shaft 11 guided through the turbine housing 1.

Figure 1:
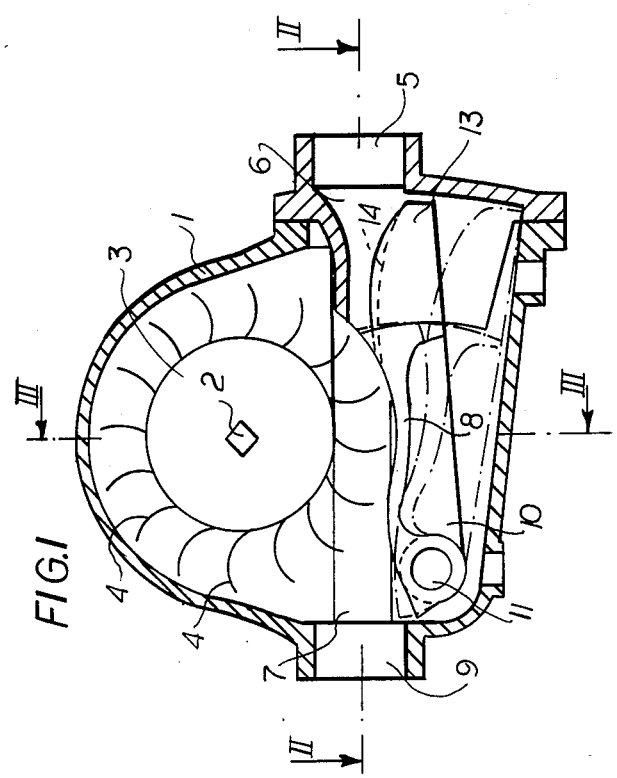
FIG. 1 is a cross sectional view through an adjustable turbine according to our invention taken in a plane perpendicular to the rotor shaft.

The control device or deflector 8 continues with a fingerlike projection 13 longitudinally in the direction of the entrance opening 5. As seen in FIG. 1 this fingerlike projection 13 has the shape of the contour of the nozzle 6 with a partially curved groove 14 along this contour.

The fingerlike projection 13 projects completely into the nozzle 6 which is slotted in the longitudinal direction and open on its under side so that on pivoting the control device 8 between the walls 14 the finger 13 slides into the slot between them.

As is apparent from FIG. 1 when the finger like projection 13 is in the position shown by solid lines in the drawing the nozzle 6 has a its smallest circular cross section but when the finger like projection 13 is in the position shown by the dot-dashed lines the nozzle 6 has an oval larger cross section. Since as already mentioned the finger like projection 13 is rigidly attached in the distributing member 8, the annular clearance between the distributing member 8 and the curved vanes 4 varies as well as the cross section of the nozzle 6, whereby a fine rotational speed control or adjustment can be attained over an entire area.

The shaft 2 can be connected to a hose takeup reel or another drive for moving the sprinkler or irrigator across a field.

The pressure drop through the turbine remains small as a result of the propitious guiding of the flowing water.

Since the turbine is completely filled during operation, the following positive properties result:
a high rotational speed stability (a very slight decrease in rotational speed on loading),
no racing of the turbine with a slight decrease in load, its largest output occurs at a low rotational speed so that no gear or drive is required for the above mentioned application, and
no filter is required for the water flowing through the turbine since its simple structure and adjustability are insensitive to sand and dirt.

The turbine according to our invention can be mounted in any conceivable position with a constant good efficiency. It also can be mounted in a position rotated 180° to that shown in FIG. 1.

We claim:

1. A turbine, particularly for a sprinkler system, comprising:
   a turbine housing formed with a turbine chamber surrounding an axis and formed with an inlet and an outlet generally aligned along a tangent to a circle centered on said axis;
   a rotor in said chamber rotatable about said axis and having a wheel formed with a rim and a circumferential array of curved vanes attached to said rim and tangentially entrained by a generally tangential flow of water traversing a substantially linear path from said inlet to said outlet, said housing defining an annular clearance with said rotor;
   a nozzle formed at said inlet and training said flow of water against said vanes; and
   a control device in said housing including an elongated member extending substantially from said outlet to said inlet and displaceable toward and away from said rotor for simultaneously controlling said clearance in a region between said inlet and outlet and a flow cross section of said nozzle to regulate the velocity of said flow over a region of said rotor between said inlet and said outlet.

2. The turbine defined in claim 1 wherein said member is formed ina single piece.

3. The turbine defined in claim 2, further comprising a pivot shaft in said housing substantially parallel to said axis and swingably mounting said member in said housing.

4. The turbine defined in claim 3 wherein said pivot shaft is disposed in the region of said outlet.

5. The turbine defined in claim 4 wherein said member is a broad-surface plate shaped to follow a radius of curvature of said array of curved vanes and having a fingerlike projection at an end of said member opposite said pivot shaft and extending in a direction perpendicular to said pivot shaft.

6. The turbine defined in claim 5 wherein said projection is positioned so as to be movable between two parallel walls of a fixed part of said nozzle formed by said turbine housing.

7. The turbine defined in claim 6 wherein said projection is an extension of a reinforcing rib formed under said plate.

* * * * *